United States Patent
Feldmann et al.

(10) Patent No.: US 6,504,320 B2
(45) Date of Patent: Jan. 7, 2003

(54) GAS DISCHARGE LAMP COMPRISING A PHOSPHOR LAYER

(75) Inventors: Claus Feldmann, Aachen (DE); Thomas Juestel, Aachen (DE); Cornelis Reinder Ronda, Aachen (DE); Hans Otto Jungk, Langerwehe (DE); Jacqueline Merikhi, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/866,416

(22) Filed: May 25, 2001

(65) Prior Publication Data

US 2002/0047620 A1 Apr. 25, 2002

(30) Foreign Application Priority Data

May 31, 2000 (DE) .......................... 100 26 913

(51) Int. Cl.[7] .............................................. H05B 37/00
(52) U.S. Cl. ...................... 315/289; 315/291; 313/485
(58) Field of Search .............................. 315/58, 74, 76, 315/224, 324, 326, 289, 291; 313/234, 485, 491

(56) References Cited

U.S. PATENT DOCUMENTS

| 4,265,950 A | * | 5/1981 | Graff ............................ 428/35 |
| 5,714,835 A | * | 2/1998 | Zachau et al. .............. 313/486 |
| 6,097,155 A | * | 8/2000 | Vollkommer et al. ......... 315/58 |

FOREIGN PATENT DOCUMENTS

DE    19727607    1/1999    ............ H01J/29/20

* cited by examiner

Primary Examiner—Don Wong
Assistant Examiner—Jimmy T. Vu
(74) Attorney, Agent, or Firm—Ernestine C. Bartlett

(57) ABSTRACT

A gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, which phosphor layer comprises a phosphor preparation of a phosphor powder and a coating, which coating comprises a compound selected from the group formed by the fluorides and orthophosphates of the elements magnesium, calcium, barium, aluminum, scandium, yttrium and lanthanum, and provided with an electrode structure for a dielectrically impeded discharge, and with means for igniting and maintaining the dielectrically impeded discharge.

4 Claims, No Drawings

GAS DISCHARGE LAMP COMPRISING A PHOSPHOR LAYER

The invention relates to a gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, and provided with an electrode structure for a dielectrically impeded discharge, and with means for igniting and maintaining the dielectrically impeded discharge.

Gas discharge lamps for dielectrically impeded discharges are used, particularly, in office automation devices, for example color copiers and color scanners, in signal devices, for example as brake lights and direction indicator lights in automobiles, in auxiliary illumination devices, for example, the courtesy lighting of automobiles, as well as, in particular, for the background lighting of displays and display screens, for example of liquid crystal displays.

Said applications require the luminance to be both uniform throughout the length of the lamp and high. To increase the luminance, it is necessary to increase the power that is coupled into the system. However, this also causes a higher load to be imposed on, inter alia, the phosphors in the phosphor layer. The phosphors degrade more rapidly and the luminous output decreases more rapidly during operation as the power coupled in increases.

A luminescent screen, in particular a plasma display screen comprising a phosphor preparation of an aluminate phosphor provided with a coating including one or more catenation polyphosphates of metals selected from of the group formed by the alkaline earth metals, zinc, cadmium or manganese, which protect the phosphor against degradation, are already disclosed in DE 197 27 607 A1.

It is an object of the invention to provide a gas discharge lamp for dielectrically impeded discharges, which discharge lamp can be reliably operated at a high power for a long period of time.

In accordance with the invention, this object is achieved by a gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, which phosphor layer comprises a phosphor preparation of a phosphor powder and a coating, which coating comprises a compound selected from the group formed by the fluorides and orthophosphates of the elements magnesium, calcium, barium, aluminum, scandium, yttrium and lanthanum, and provided with an electrode structure for a dielectrically impeded discharge, and with means for igniting and maintaining the dielectrically impeded discharge.

In such a gas discharge lamp for dielectrically impeded discharges, the degradation of the phosphor under the influence of VUV or UV-C radiation is reduced or completely suppressed.

The fluorides and orthophosphates mentioned hereinabove form a hard, water-insoluble coating on the phosphor particles, they do not react with the phosphors and even exposure to radiation does not lead to degradation of these fluorides and orthophosphates. As they are colorless, they do not influence the colors of the phosphors. They are hydrophilic, so that the coated phosphor particles can be readily dispersed.

It has also been found that the gas discharge couples very well to the wall coated with the phosphor layer.

Within the scope of the invention it is preferred that the coating is applied in a quantity in the range from 0.1 to 10% by weight with respect to the phosphor.

It is particularly preferred that the phosphor is $BaMgAl_{10}O_{17}$:Eu.

Particularly advantageous effects in comparison with the prior art are achieved when the phosphor is $BaMgAl_{10}O_{17}$:Eu and the coating comprises a compound selected from the group formed by the fluorides and orthophosphates of the elements magnesium, barium and aluminum. The coating completely and homogeneously covers the surface of the $BaMgAl_{10}O_{17}$:Eu powder and the adhesion of said coating is excellent.

These and other aspects of the invention will be apparent from and elucidated with reference to the embodiment(s) described hereinafter.

A gas discharge lamp for dielectrically impeded discharges in accordance with the invention comprises a discharge vessel containing a gas filling, which discharge vessel comprises at least a wall of a dielectric material and at least a wall comprising a surface which is at least partly transparent to visible radiation and coated with a phosphor layer. Said phosphor layer comprises a phosphor composition of a phosphor powder provided with a coating, which coating includes a compound selected from the group formed by the fluorides and orthophosphates of the elements magnesium, calcium, barium, aluminum, scandium, yttrium and lanthanum. In addition, the gas discharge lamp is provided with an electrode structure for a dielectrically impeded discharge, and with means for igniting and maintaining said dielectrically impeded discharge.

A typical construction of the gas discharge lamp comprises a cylindrical, xenon-filled lamp bulb of glass whose outer wall is provided with a pair of stripe-shaped electrodes which are arranged so as to be electrically insulated from each other. The stripe-shaped electrodes extend throughout the length of the lamp bulb so as to face each other with their long sides, while leaving two gaps clear. The electrodes are connected to the poles of a high-voltage source, which is operated at an alternating voltage of the order of 20 kHz to 500 kHz in such a manner that an electric discharge develops only in the area of the inside surface of the lamp bulb.

If an alternating voltage is applied to the electrodes, a corona discharge can be ignited in the xenon-containing filling gas. This leads to the formation of excimers in the xenon, i.e. molecules which consist of an excited xenon atom and a xenon atom in the ground state.

$$Xe+X^*=Xe_2.$$

The excitation energy is delivered as UV radiation with a wavelength $\lambda=170$ to 190 nm. This conversion of electron energy to UV radiation takes place very efficiently. The generated UV photons are absorbed by the phosphors of the phosphor layer and the excitation energy is partly delivered again in the region of the spectrum having a longer wavelength.

In principle, a plurality of different structural shapes are possible for the discharge vessel, such as plates, simple tubes, coaxial tubes, straight, U-shaped, circularly bent or coiled cylindrical, or differently shaped, discharge tubes.

As the material for the discharge vessel use is made of quartz or glass types which are transparent to VUV and UV-C radiation.

The electrodes consist of a metal, for example aluminum or silver, a metal alloy or a transparent, conductive, inorganic compound, for example ITO. They can be embodied so as to be a coating, an adhesive foil, wire or wire netting.

To concentrate the light intensity in a specific direction, a part of the discharge vessel may be provided with a coating serving as a reflector for VUV and UV-C light.

The discharge vessel is filled with a gas mixture comprising an inert gas such as xenon, krypton, neon or helium. Gas fillings comprising predominantly oxygen-free xenon are preferred.

The inner wall of the gas discharge vessel is partly, or entirely, coated with a phosphor layer containing one or more phosphors or phosphor preparations. In addition, the phosphor layer may comprise organic or inorganic binders or a binder composition.

For the phosphor use is preferably made of a VUV phosphor which generally comprises a host lattice of an inorganic oxygen-containing material such as oxides, aluminates, phosphates, borates or silicates, doped with a few percent of an activator. The aluminate phosphors which, in accordance with the invention, are provided with a stabilizing coating are first and foremost phosphors on the basis of $MeMgAl_{10}O_{17}$, where Me=Ba, Sr, Eu having the β-alumina-crystal structure, for example $BaAl_{10}O_{17}$:Eu (BAM), $Ba(MgAl)_{10}O_{17}$:Mn and $BaAl_{12}O_{19}$:Mn, as well as phosphors having a similar crystal structure, such as $BaMgAl_{16}O_{27}$:Eu and $BaMgAl_{14}O_{23}$:Eu. In addition, aluminate phosphors can be used having the magnetoplumbite structure $MeAl_{12}O_{19}$, where Me=Ca, Sr, Eu, or $Ba(Mg,Al)_{11}O_{19}$:Eu. These aluminate phosphors are particularly efficient when they are excited by UV or vacuum-UV radiation.

Particularly preferred phosphors are the red-luminescent $(Y,Gd)BO_3$:Eu, the green-luminescent $ZnSiO_4$:Mn and the blue-luminescent $BaMgAl_{10}O_{17}$:Eu.

The absorption coefficient of said phosphors is particularly high, and the quantum yield high, for the wavelengths in the xenon radiation range. The host lattice does not take part in the luminescence process, instead it influences the exact position of the energy levels of the activator ion and hence the wavelengths of absorption and emission.

The grain size of the phosphor particles is not critical. Customarily, use is made of phosphors in the form of fine-grain powder having a grain size distribution between 1 and 20 μm.

These phosphor powders are coated with a thin, uniform layer of one or more compounds selected from the group formed by the fluorides and orthophosphates of the elements magnesium, calcium, barium, aluminum, scandium, yttrium and lanthanum.

The layer thickness customarily ranges from 0.001 to 0.2 μm and, thus, is so thin that it can be penetrated by the UV radiation without substantial loss of energy. In particular $MgF_2$ is also characterized by a low refractive index n=1.3.

The coatings of these materials on the phosphor particles can be applied, for example, by deposition from the gas phase a wet-coating process.

Preferably, precipitation is used as the wet-coating method for the phosphor particles. Precipitation is based on a controlled, slow reaction of water-soluble fluorides or orthophosphates with water-soluble compounds of magnesium, calcium, barium, aluminum, scandium, yttrium or lanthanum in the presence of the phosphor powder. The concentration of these compounds in the reaction solution is slowly increased until the point of precipitation is reached. A further increase of the concentration causes the fluorides and orthophosphates of the elements magnesium, calcium, barium, aluminum, scandium, yttrium and lanthanum to deposit on the phosphor particles, which act as crystallization nuclei.

Water-soluble starting compounds of magnesium, calcium, barium, aluminum, scandium, yttrium and lanthanum are carbonates or nitrates. In particular sodium compounds can suitably be used for the water-soluble orthophosphates and fluorides.

To prepare the reaction solution, one or more water-soluble orthophosphates or fluorides are solved in water either separately or jointly. The concentration of the orthophosphate(s) or fluoride(s) in the aqueous solution may range, dependent upon the cation, from 0.5 to 10% by weight.

Customarily, water is used as the solvent. A content of 20 to 90% by weight of an organic solvent such as ethanol, methanol, acetone etc. requires special safety measures, however, it does lead to an improved deposition of the orthophosphates and fluorides.

The phosphor to be coated is dispersed in this solution for 10 to 30 minutes. In addition, a solution of a water-soluble magnesium salt, calcium salt, strontium salt, barium salt, aluminum salt, scandium salt, yttrium salt or lanthanum salt in water is prepared in a concentration ranging from 1 to 15% by weight.

This solution is added to the phosphor suspension, the pH-value being monitored continuously. Said pH-value must remain in the neutral to alkaline range, preferably in the range between 9.5 and 11.5, which can be achieved, if necessary, by the metered addition of sodium hydroxide solution or ammonia. This suspension is stirred for 1–5 hours in order to irreversibly age the coating.

Subsequently, the phosphor preparation is separated from the excess coating solution, washed by means of a washing liquid such as alcohol/water and dried at a temperature in the range from 100 to 150° C. By virtue of this method, a coating is obtained which is very resistant, both mechanically and chemically, and which adheres firmly to the substrate.

By means of ESCA measurements it can be established whether the coating completely covers the phosphor particles, although, within the scope of the invention, it is not necessary for the coating to absolutely tightly encapsulate the phosphor particles.

The coating is hydrophilic and compatible with the customary coatings, so that it can suitably be used as the base layer for further coatings, which may be subsequently applied to improve the powder properties or the colors of the phosphor.

The coating itself is not subject to degradation. All in all, the service life of the phosphor is increased by a factor of 5–10 by the coating, which can be determined by ALT tests.

For the manufacture of a phosphor layer on a wall of the discharge vessel use can be made of dry coating methods, such as electrostatic deposition or electrostatically assisted powdering, as well as of a wet coating method, such as dip-coating or spraying. In the case of the wet coating method, the phosphor preparation must be dispersed in water, an organic solvent, if necessary in conjunction with a dispersing agent, a surface active agent and an anti-foaming agent, or a binder preparation. Organic or inorganic binders capable of withstanding an operating temperature of 250° C. without being subject to decomposition, embrittlement or discoloration can suitably be used as the binder preparations for a gas discharge lamp in accordance with the invention.

The phosphor preparation can be applied, for example, to a wall of the discharge vessel by means of a flow-coating process. The coating suspensions used for the flow-coating process comprise water or an organic compound, such as butylacetate, as the solvent. The suspension is stabilized by adding auxiliary agents, such as stabilizers, liquefiers cellulose derivatives, and influenced in its rheological properties. The phosphor suspension is applied in the form of a thin layer to the walls of the vessel, after which it is dried and burned in at 600° C.

It may alternatively be preferred to electrostatically deposit the phosphor preparation for the phosphor layer onto the inside of the discharge vessel.

The layer thickness of the phosphor layer customarily ranges from 5 to 100 μm.

The vessel is subsequently evacuated so as to remove all gaseous impurities, in particular oxygen. Next, the vessel is filled with xenon and sealed.

EXAMPLE 1

A quantity of 100 g $BaMgAl_{10}O_{17}$:Eu are dispersed in 1 l water and subjected to a wet-grinding process for 8 hours in order to disagglomerate the phosphor particles. A quantity of 21 g $Mg(NO_3)_2 \times 6H_2O$, dissolved in 200 ml water, are added drop-wise, while stirring continuously, to the disagglomerated phosphor suspension. The pH-value of the suspension is maintained in a range from 6.5 to 7.5. After the NaF solution has been added drop-wise, the suspension is stirred for another hour and the pH-value is increased to 8.5. After stirring for further 30 minutes, the coated phosphor is filtered off and washed a number of times by means of distilled water. Next, the coated phosphor is dried at 120° C. for 4 hours. As a result, $BaMgAl_{10}O_{17}$:Eu coated with 5% by weight $MgF_2$ is obtained.

EXAMPLE 2

A quantity of 100 g $BaMgAl_{10}O_{17}$:Eu are dispersed in 1 l water and subjected to a wet-grinding process for 8 hours in order to disagglomerate the phosphor particles. A quantity of 10 g $Na_3PO_4 \times 12H_2O$, dissolved in 200 ml water, are added drop-wise, while stirring continuously, to the disagglomerated phosphor suspension. The pH-value of the suspension is maintained in a range from 8.0 to 9.0. After the sodium phosphate solution has been added drop-wise, the suspension is stirred for another hour and the pH-value is increased to 9.5. After stirring for further 30 minutes, the coated phosphor is filtered off and washed a number of times by means of distilled water. Next, the coated phosphor is dried at 120° C. for 4 hours and subsequently in an $N_2$ atmosphere at 500° C. for 2 hours. As a result, $BaMgAl_{10}O_{17}$:Eu coated with 5% by weight $Ba_3(PO_4)_2$ is obtained.

What is claimed is:

1. A gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, which phosphor layer comprises a phosphor preparation of a phosphor powder and a coating, which coating comprises a compound selected from the group formed by the fluorides and orthophosphates of the elements magnesium, calcium, barium, aluminum, scandium, yttrium and lanthanum, and provided with an electrode structure for a dielectrically impeded discharge, and with means for igniting and maintaining the dielectrically impeded discharge.

2. The gas discharge lamp as claimed in claim 1, characterized in that the coating is applied in a quantity in the range from 0.1 to 10% by weight with respect to the phosphor.

3. The gas discharge lamp as claimed in claim 1, characterized in that the phosphor is $BaMgAl_{10}O_{17}$:Eu.

4. The gas discharge lamp as claimed in claim 1, characterized in that the phosphor is $BaMgAl_{10}O_{17}$:Eu and the coating comprises a compound selected from the group formed by the fluorides and orthophosphates of the elements magnesium, barium and aluminum.

* * * * *